Feb. 26, 1946.   O. FIRING   2,395,473
APPARATUS AND METHOD OF CONTROLLING PAIRED OPERATIONS,
PARTICULARLY FOR MAKING SLIDE FASTENERS
Filed Aug. 19, 1942   4 Sheets-Sheet 1

INVENTOR
OSBORNE FIRING
BY
Emery, Varney, Whittemore + Bix
ATTORNEYS

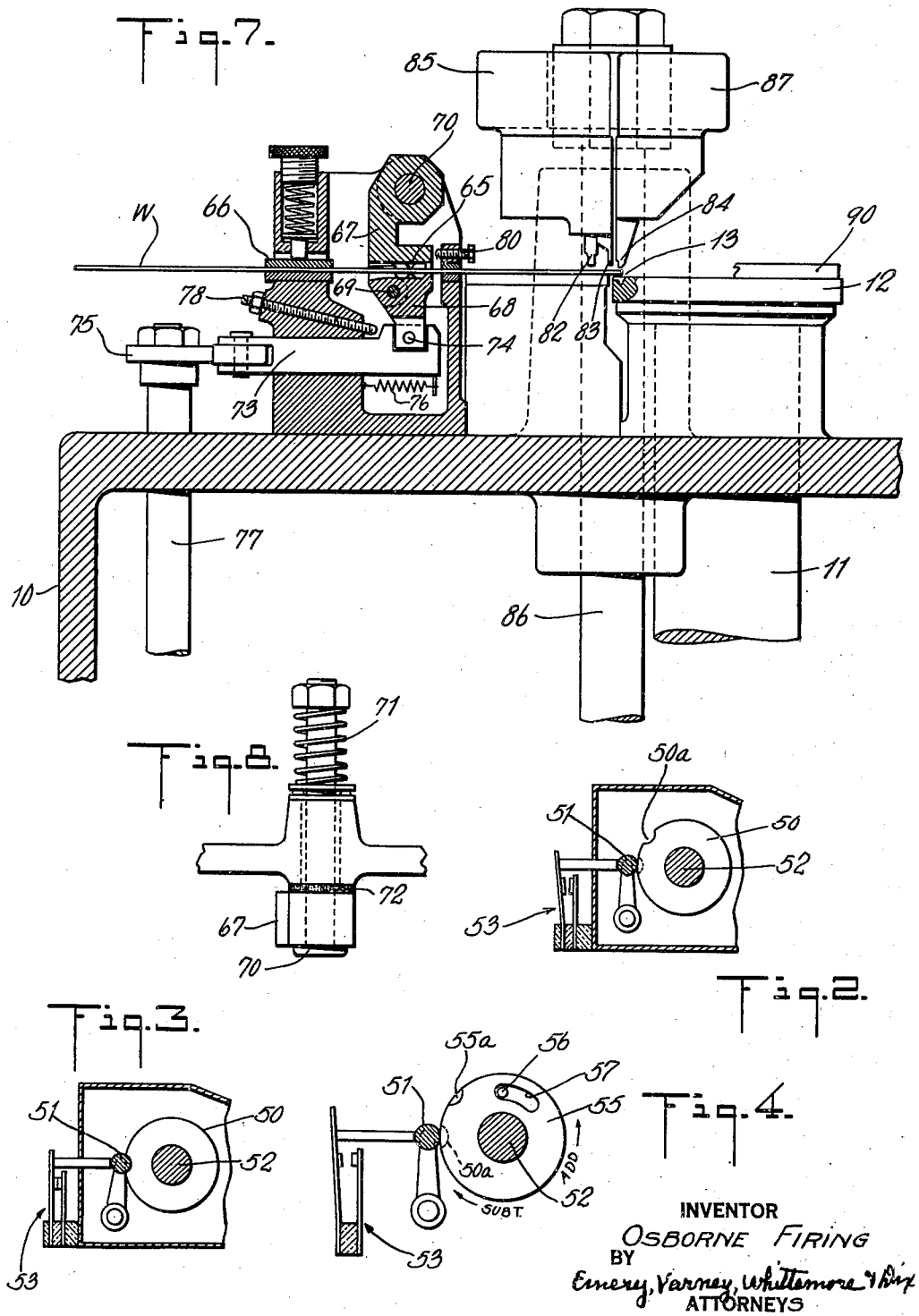

Feb. 26, 1946.  O. FIRING  2,395,473
APPARATUS AND METHOD OF CONTROLLING PAIRED OPERATIONS,
PARTICULARLY FOR MAKING SLIDE FASTENERS
Filed Aug. 19, 1942  4 Sheets-Sheet 3
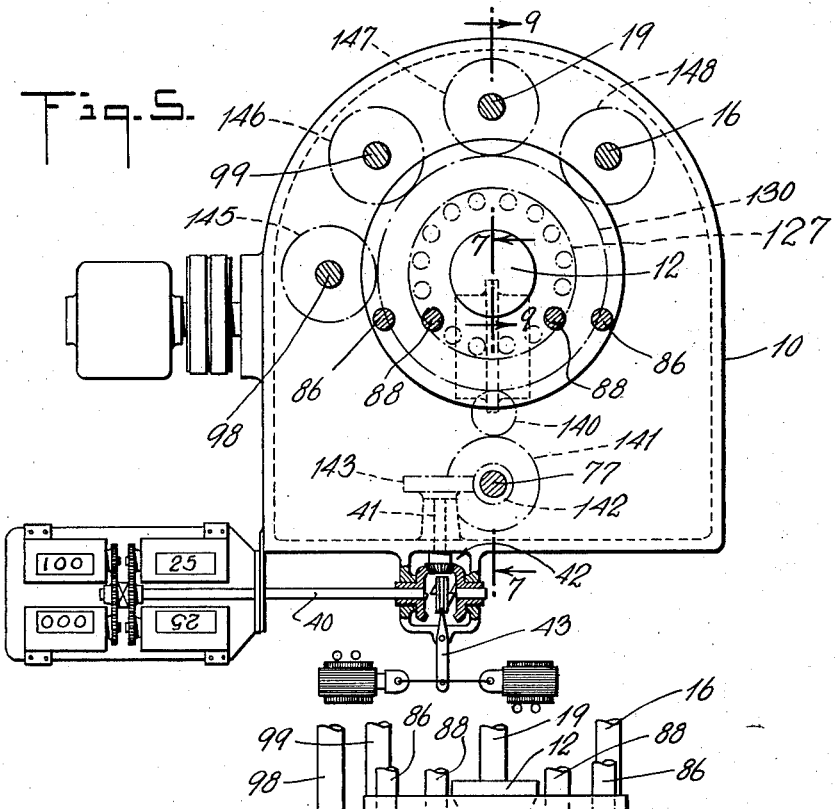
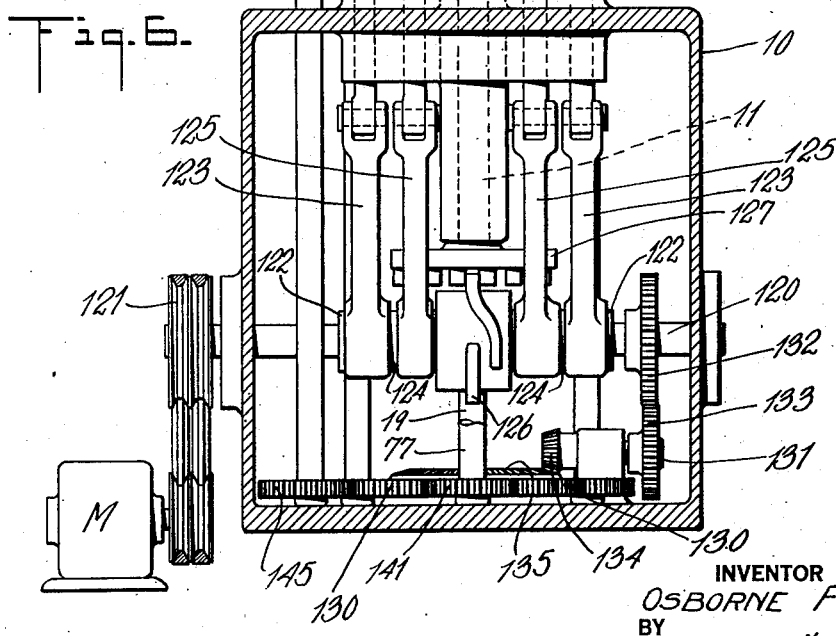
INVENTOR
OSBORNE FIRING
BY
Emery, Varney, Whittemore + Dix
ATTORNEYS Patented Feb. 26, 1946

2,395,473

UNITED STATES PATENT OFFICE 2,395,473

APPARATUS AND METHOD OF CONTROLLING PAIRED OPERATIONS, PARTICULARLY FOR MAKING SLIDE FASTENERS

Osborne Firing, New Dorp, Staten Island, N. Y., assignor to Strauss Fasteners Inc., New York, N. Y., a corporation of New York Application August 19, 1942, Serial No. 455,334

23 Claims. (Cl. 153—1)

This invention relates to method and apparatus for controlling plural-station machine operations, particularly of machines for forming and attaching slide fastener elements, and has for an object the provision of improvements in this art.

This application is a continuation-in-part of my copending application, Serial No. 324,457, filed March 18, 1940.

In my Patent No. 2,231,286, granted February 11, 1941, there is disclosed a machine for forming fastener elements one after another at a single station and alternately applying or attaching the elements to tapes at two stations. The operations at the forming station and the applying stations are coextensive in time, though varying in phase; or expressed another way, the operations at the forming station are continuous and the operations at each of the attaching stations are continuous though only half as frequent as at the forming station. The tapes at the two attaching stations are fed forward together though by alternate movements. Between the forming station and the attaching stations the elements move in opposite directions on a reciprocating carrier. Jump feed, or the movement to provide long spacings between groups of elements on the tapes, is accomplished in the period of time allowed for regular feed or the movement to provide spacings between successive elements or units in a group.

The method and apparatus of my above-mentioned patent effected considerable economy in time and production; the present invention effects yet further economy in time with greater dependability in production, and thus permits much higher speed of operation of the machine.

Instead of employing a carrier which moves alternately in opposite directions, as was disclosed in the illustrative embodiment of my patent, the present invention employs a carrier in the form of a turntable which moves consistently in steps in one direction. The carrier is provided with a plurality of element holders which are adapted to cooperate with mechanism at a plurality of stations spaced around the turntable. At one station the elements are fed to the carrier holders; at another station the protruding jaws of the elements are spread; and at a plurality of stations the elements may be attached to tapes.

The type of operations and the general mode of handling the elements may be in general conformity with the disclosure of my patent.

Thus at the feeding station the elements may be formed head-first successively from a strip or wire, the head being formed in one of a plurality of dies constituting the element holders on the carrier.

The elements move in successive steps away from the forming station with their jaws protruding from the carrier dies in which their heads are held. At one or more stations the jaws, if not formed in open position, may be spread as by a radially moving wedge-shaped tool. Whereas it was found advisable in my patent to spread the jaws while the elements were in motion, according to the present invention they may be spread while the elements are halted at the jaw-spreading station or stations.

From the jaw-spreading station the elements move to one of a plurality of attaching stations. And it is the operations at the attaching stations and the control of these operations with which the present invention is especially interested. It is here that greater speed and accuracy of operation are attained.

Whereas in my patent and in the art generally the two tapes are fed along together, the present method is to feed only one tape at a time while a group of elements is being applied—except that the other tape may be fed along further until the blank space between groups is provided—after which it is halted until the group on the other tape has been attached. That is to say, the elements are applied alternately in groups instead of alternately in units to the two tapes; and instead of effecting the inter-group spacings by a jump feed, they are effected by a continued unit feed. Elements are continuously applied to one or the other of the tapes at the same rate at which they are formed or fed to the carrier, and the only time that there is an overlapping movement of both tapes is while the inter-group spacings are being effected. At this time the step-by-step movement of the retiring or stopping tape is continued to create the desired length of blank space after the attachment of elements upon the incoming or starting tape has begun. Thus we have this type of operation: Start A, space B; continue A, stop B; space A, start B; stop A, continue B; and repeat.

It should be observed that the reason for feeding tapes in pairs is because they are eventually used in pairs, and the element spacings must be very accurately matched if the slider is to operate properly in service. It may happen over a period of time, due to wear and other factors, that the thickness of the elements or their spacings or both may vary and, although the variations may hardly be noticeable, they are cumulative for the many units and their total effect would be objectionable. If the elements are applied in the usual manner, as: unit A, unit B, unit A, unit B, and so on, to the two tapes, and the corresponding or paired tape groups are kept together until they are finally attached for service, there is little possibility of trouble from variations in machine operation. The present invention takes advantage of the fact that variations are gradual and that the elements may be applied in the manner of: group A, group B, group A, group B, and so on, with full assurance that the adjacent groups on the two tapes will match perfectly. Even when there are several hundred elements in a group it is found that the machines do not get out of adjustment during the time two alternate groups are being applied.

One way of operating according to the present invention is to provide a plurality of successive fastener attaching stations around the turntable and to apply and take off the elements on tapes as they arrive at the desired station. If the elements are taken off at the first station none will reach the following station or stations; but if the mechanism at the first station is rendered ineffective, the elements will proceed past the first station and travel until they reach a succeeding station where the mechanism is effective.

Conveniently the tape-feeding and element-attaching mechanism may be controlled by counting devices which are paired against each other so that while one is adding the other is subtracting, and vice-versa. When the counters reach a predetermined position as, for example, zero on one and a given number on the other, trip mechanism is operated to automatically control suitable subservient mechanism and reverse the movement of the counters.

The counters which are employed by the present invention are of the well-known reversible, adding-subtracting or ascending-descending type, exemplified in the odometers or mileage indicators forming part of automobile speedometer assemblies.

Assuming that the trip mechanism is actuated when one of the counters reaches zero, this may furnish an electrical impulse which through electro-magnets or relays and clutch devices controls operations at one or both of two stations. Preferably the zero position is chosen for imparting the impulse because this is a fixed point and avoids the relocation or resetting of contacts or contact controlling elements. For initial setting it is then only necessary to see that one counter stands at zero, set its opposed mating counter at the desired number, and start the machine; whereupon the alternate operations at the stations and the reversal of the controlling counters will commence and continue indefinitely. The counter with the zero setting will begin to add, and the mating counter with the predetermined number setting will begin to subtract, and when the latter reaches zero and the other stands at the predetermined number, the reversing impulse is given.

Say it is desired to apply elements in groups of one-hundred to the tapes, one counter is brought to zero and the other is set at 100, whereupon groups of one-hundred elements will be applied in alternation to the two tapes in continuous succession.

Then say it is desired to change and make a lot of fasteners in which the elements are attached to the tapes in groups of two-hundred. The machine is stopped and one of the counters brought to zero and the other counter set at 200. When the machine is started again it will automatically apply groups of two-hundred elements in alternation to the two tapes until some other number is set on the counters. Any number within the capacity of the counters may be selected and may be set in a moment merely by adjusting the discs of the counter with a finger.

The great advantages of this will be apparent when it is realized that the number of elements in a group may be varied by a single element, more or less, or by any number of elements, almost instantaneously, and without the elaborate procedure of changing gears and drive mechanisms, which has been common practice heretofore.

Now, if the mechanisms at the two stations should operate by simple reversal, as of course they may for certain requirements, there would be no blank spaces between groups of elements on the tapes (neglecting the distance between attaching stations which cancels out under the actual operations performed on the machine). Or if it be assumed that only the element-attaching mechanisms were affected while the tape-feeding mechanisms continued to function, the blank spaces would be the same length as the groups of elements. Neither is normally desired. It is normally desired to control the length of the blank spaces, these, however, usually being much shorter than the element groups.

In order to take care of this situation a second or auxiliary pair of mating opposed reversible counters is geared with the first or main pair, one for each. Now let us say that blank spaces of twenty-five units are desired. The auxiliary counters are set at zero while moving in a subtracting direction when the companion main counters respectively register 25 while moving in the adding direction. Or, taking one machine position for the settings, the auxiliary counters are set at a predetermined number when their companion main counters stand at zero respectively.

The main counters may now be devoted exclusively to continuously reversing the direction of drive of all the counters at given periods, starting the element-attaching mechanisms, starting the tape-feeding mechanisms, and stopping the element-attaching mechanisms. The controls may be simplified somewhat by permitting the element-attaching mechanism at the second station to run continuously, it being obvious that if elements are taken off at the first station they cannot be attached at the second station because they do not reach the second station. However, it is still necessary to control the tape-feeding mechanisms at both stations.

It has just been noted that in alteration the first or main pair of counters will initiate the action of the tape-feeding mechanisms. The second pair of counters may therefore be devoted exclusively to stopping the action of the tape-feeding mechanisms. In the above-assumed setting the tape-stopping or auxiliary counters will reach zero and impart the stopping impulse twenty-five spaces after the main counters have reached zero and reversed the movement of all the counters.

It thus appears that the main counters never go below zero and that the auxiliary or tape-stopping counters never go above the predetermined number of blank spaces for which they are set. Since the number of elements in the groups is usually much larger than the units in the blank spaces it is apparent that the tape-stopping or auxiliary counters usually stand at some positions below zero. It is not necessary to investigate where they stand, because so long as they are geared into the drive mechanism with the other counters, they will always arrive back in the proper position at the proper time.

The auxiliary counters impart the tape-stopping impulse at zero while subtracting. They may arrive at zero several times while continuing to subtract, because the numerical capacity of the main counters will normally be greater than the capacity of the auxiliary counters, but the effective impulse is given on the first arrival at zero. For example, the main counters may have a total capacity of 1000, as against a capacity of 100 for the auxiliary counters. But it makes no difference if the auxiliary counters make several impulse imparting contacts while subtracting, because the first impulse stops the tape-feeding mechanism and the subsequent contacts or impulses, being of like character, cannot be effective, the mechanism having already been stopped.

However, it is desirable to prevent tape-stopping impulses when the auxiliary counters pass zero while moving in the adding direction, because the subjective tape-feeding mechanism has now been started into operation by the main counters. This may be accomplished by various means, one form of which will be described hereinafter. It is mentioned to give an understanding of the general method of control and the safeguards provided therefor.

Having given a general outline of the purposes and principles of the invention, there will now be described an exemplary form of apparatus embodying the invention. This apparatus is illustrated in the accompanying drawings, wherein:

Fig. 1 is a schematic top plan view of a machine for forming and attaching slide fastener elements which embodies the control of the present invention;

Fig. 2 is a vertical cross section through a counter on the line 2—2 of Fig. 1 to show the contact controlling mechanism;

Fig. 3 is a view similar to Fig. 2 but showing the parts in a different position;

Fig. 4 is a vertical section on the line 4—4 of Fig. 1 showing the mechanism for preventing contact actuation on the adding movement of an auxiliary or tape-stopping counter;

Fig. 5 is a top plan view, partly in phantom, below the turntable, to show the arrangement of driving mechanism on a working machine;

Fig. 6 is a vertical elevation, partly in section, looking toward the front of Fig. 5 and showing the drive mechanism but omitting the counter driving mechanism shown in Fig. 5;

Fig. 7 is a vertical section of the element-forming mechanism, the view being taken approximately on the line 7—7 of Fig. 5 but showing some parts which are not shown in Fig. 5;

Fig. 8 is a partial top plan view on Fig. 7; and

Figure 9:
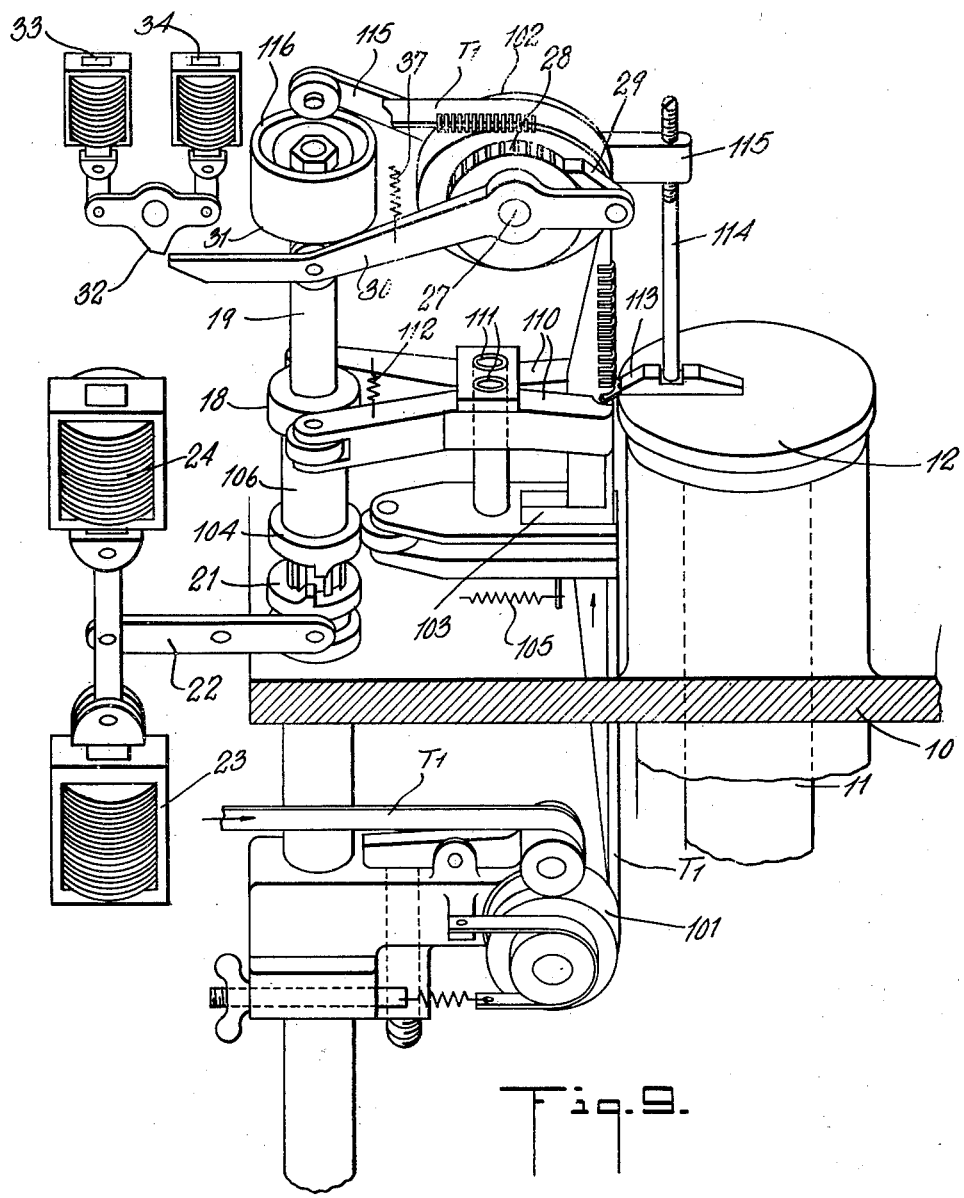
Fig. 9 is a vertical section of the element-attaching mechanism, the view being taken approximately on the line 9—9 of Fig. 5 but showing some parts which are not shown in Fig. 5.

Referring to the drawings, the machine comprises a frame or casing 10 which houses the coordinating drive mechanism operated by a motor M. Above the top of the casing 10 and driven by the vertical shaft 11 is a turntable 12 provided at equally spaced positions with a plurality of element holders 13 around its outer edge. The turntable rotates in steps in the direction indicated by the arrow in Fig. 1 to carry the elements from station to station and to halt them at a station for the necessary operations thereat. These element holders may be adapted to receive and hold preformed elements with the jaws protruding; or may, as in my patent, and as described hereinafter in connection with Figs. 7 and 8, consist of dies which cooperate in the formation of elements head-first from wire stock.

The element-feeding or forming station is designated by the letter F. From the feeding station the elements proceed in steps to one of two attaching stations A1 or A2 where they are secured by their protruding jaws to one of two tapes T1 or T2. The mechanism for attaching the elements to the tapes may be similar to that shown in my patent and is shown herein in Fig. 9. Between the feeding station and the first attaching station the jaws may be spread, if they are not already spread when they are fed to the turntable. The spreading may be effected at one or more spreading stations S1 and S2, as for example by radially moving plungers, one of which at station S1 may be wedge-shaped to start the spreading, and the other of which at station S2 may be more obtuse to complete the spreading operation.

The element-attaching mechanisms at the two stations A1 and A2 may be driven in alternation by identical drive means; but inasmuch as the mechanism at station A2 may operate harmlessly when no elements are reaching that station, as, for example, when they are all being attached and taken off at station A1, the control mechanism is simplified by permitting the attaching mechanism at station A2 to operate continuously. It will be understood hereinafter that this is done. The element-attaching mechanism at station A2 is shown to be driven by a shaft 16 which in turn is driven in coordination with the other parts of the machine. The element-attaching mechanism at station A1 is the same as that at station A2 except that in addition to the shaft 19 for operating the element-attaching mechanism, it also comprises a clutch 21 controlled by a lever 22 from a pair of electro-magnetic clutch-shifting devices 23 and 24. The magnet 23 when energized throws the clutch into engagement to start the element-attaching mechanism at station A1, and the magnet 24 when energized throws the clutch out of engagement to stop the element-attaching mechanism at station A1.

There are separate tape-feeding mechanisms for tapes T1 and T2 at the two stations, as already noted, and this mechanism at each station is rendered effective or ineffective for feeding the tape at predetermined times. A convenient form of mechanism is one wherein the drive means operates continuously and is made effective and ineffective at will. For example, the tape-feeding shaft 27 at each station may carry a ratchet wheel 28 which is operated by a pawl 29 carried by a lever 30. A constantly rotating cam 31 actuates the arm 30 except when it is held in inoperative position by a latch 32. The latch for station A1 is controlled by the electro-magnetic devices 33 (starting) and 34 (stopping), and the latch for station A2 is controlled by the electro-magnetic devices 35 (starting) and 36 (stopping). The arms may be pulled toward the cams by any suitable means, such as springs 37.

For controlling the operations at the element-applying stations there is provided a pair of principal or main counters P1, P2 and a pair of auxiliary, halting, or stop counters H1, H2. All of the counters are driven at all times in either forward or reverse direction by a counter driving shaft 40 taking power from a shaft 41 through a reverse clutch generally designated by the numeral 42. The clutch is controlled by a shift lever 43 from a pair of electro-magnetic devices C1, C2.

The counter P1 upon reaching zero after moving in the reverse direction energizes the electromagnet 23 which starts the element-attaching mechanism at station A1, energizes the electromagnet 33 which starts the tape-feeding mechanism at station A1, and energizes the electromagnet C1 which reverses the drive of all the counters. The counter P1 then begins to add, P2 to subtract, H1 to add and H2 to subtract.

The settings shown in Fig. 1 are for the application of one-hundred (100) elements in a group and the provision of twenty-five (25) spaces between groups. The counter P1 registers 000, the counter P2 registers 100, the counter H1 registers minus 75 (its dials read 25), and the counter H2 registers 25.

When the counter H2 reaches zero while moving from 25 in the subtracting direction it will make contact and energize the electro-magnet 36 to stop the tape-feeding mechanism at station A2. Thereafter the counter H2 will continue to subtract until it reaches minus 75 (reading 25) when the counter P2 has reached zero. At that time the counter P2 will energize the electromagnet 24 to stop the element-applying mechanism at station A1, energize the electro-magnet 35 to start the tape-feeding mechanism at station A2, and energize the electro-magnet C2 to reverse the counter-driving mechanism. The element-applying mechanism at station A2 will already be in operation because it never ceases to operate so long as the machine runs.

The counter H1 now stands at 25 and begins to subtract. When it reaches zero it will make contact and energize electro-magnet 34 to stop the tape-feeding mechanism at station A1. Thereafter the counter H1 will continue to subtract until it reaches minus 75 (reading 25) when the counter P1 reaches zero. At that time the cycle is begun again.

If some other number of elements in a group or some other number of units in the blank spaces between groups is desired, the machine is stopped, preferably with one of the counters P1 or P2 standing at zero, and the other counters are set at the desired figures. Say it is now desired to apply two-hundred and eighteen (218) elements in a group and that counter P1 stands at zero, the counter discs of counter P2 (which stands at 100, will be turned by hand until the counter reads 218. Also, say it is desired to have an inter-group spacing of fifty-three (53) units, the counter H2 which stands at 25 will be run up to 53 and the counter H1 which stands at minus 75 (reading 25) will be moved in the adding direction until it stands at minus 65 (reading 35). As to the counter H1, it may be explained that this setting gives the same result as setting it at plus 53 (ready to begin subtracting) when the counter P2 stands at zero; and the setting may be made in the latter way when desired.

As shown in Figs. 1, 2 and 3, the counters are provided with notched discs 50 by which they may be turned with the finger, after being disconnected from the other discs when necessary. When the notches 50a of all the discs of a counter are in alignment, as when the counter dials all stand at zero, the rod 51 moves inward toward the dial shaft 52 and closes the switch 53.

For a purpose already explained, the stop counters H1 and H2 are provided with means to prevent them from closing the switch when moving in the adding direction. As shown in Figs. 1 and 4, this safety mechanism may be embodied in an extra notched disc 55 having a loose motion connection through a pin 56 in a slot 57 with the last counter disc 50. When the dial disc is moving in the adding direction the notch 55a of the auxiliary disc (Fig. 4) will not line up with the notches 50a of the other discs of the counter; but when the counter moves in the subtracting direction the notch of disc 55 does line up with the notch of the companion dial disc 50, and when the discs all reach zero while moving in the subtracting direction all of the notches will be in alignment and allow the switch actuating rod 51 to move into them and to close the switch.

In operation, an element E is fed head first onto a turntable holder or die 13 which is located at station F. There are sixteen dies 13 on the turntable illustrated in the present apparatus. The elements may be formed from wire stock W, as for example by mechanism F such as that disclosed in my patent and shown in Fig. 7 herein. The jaws of the elements protrude from the periphery of the turntable and, if not already spread when they are fed onto the turntable, they may be spread while halted at the spreading stations S1 and S2. They may, of course, be spread at a single station but, as plenty of time is provided while they are travelling to the attaching stations, they may be spread in stages, as shown, first by a wedge-shaped radially moving punch and next by a more obtuse radially moving punch.

After their jaws are spread (when that is necessary) the elements reach the first attaching station A1. By providing a plurality of attaching stations the work may be divided between them, and this in itself, in combination with forming mechanism which operates at unit intervals and a one-way moving carrier, is believed to be a new and improved arrangement. But in the specific arrangement illustrated the elements are taken off in groups at each of the several attaching stations, the elements of each group being applied at unit intervals or at the same rate at which they are fed. In this way all major operations, including element-formation, element-attachment and tape-feeding, are carried out at the same rate and in step, thus providing greater accuracy, smoothness, speed and durability.

In the position of parts shown in the drawings, the attaching and tape-feeding mechanisms at station A1 are just beginning operation, this having been initiated by the energization of magnet 23 when contact was made at counter P1 upon reaching zero. The element-attaching mechanism at station A2 is operating, because it operates continuously; but it will not apply elements after the last group has been finished, because they will all be taken off at station A1. The tape-feeding mechanism at station A2 continues to operate step-by-step until the desired length of inter-group spacing is provided, twenty-five (25) spaces in the setting illustrated, after which the counter H2 reaches zero while moving in a subtracting direction to close the contacts to energize the magnet 36 and stop the operation of the tape-feeding mechanism at station A2. Twenty-five (25) elements have been attached by this time at station A1. Taking the setting shown, there will be one-hundred (100) elements attached in a group. Hence when main counter P1 reads 100 the auxiliary counter H2 will stand at minus 75 (reading 25). At this time the other main counter P2 will stand at zero and make contact to energize magnet 24 and stop the element-attaching mechanism at station A1 and energize the magnet 35 to start the tape-feeding mechanism at station A2. It also energizes magnet C2 to reverse the drive of all the magnets. The tape-feeding mechanism at station A1 continues to operate for twenty-five (25) spaces until auxiliary counter H1 stops it by energization of magnet 34.

Attachment of elements at station A2 begins as soon as the attachment of elements at station A1 ceases and elements begin to arrive at station A2. When one-hundred (100) elements have been passed to station A2 the counter P1 again stands at zero, the counter P2 at 100, counter H2 at 25, and counter H1 at minus 75 (reading 25). Counter P1 closes its contacts at zero to energize magnet 23 which starts the element-attaching mechanism at station A1; to energize magnet 33 which starts the tape-feeding mechanism at station A1; and to energize magnet C1 which reverses the drive of all the counters.

With these settings for one-hundred (100) elements in a group and twenty-five (25) units in an inter-group blank space, the auxiliary counters H1 and H2 cross zero twice, once while subtracting from plus 25 to minus 75 and once while adding from minus 75 to plus 25, but the auxiliary counters make contact at zero only when moving in the subtracting direction. For while the discs 50 of the counter dials (Fig. 4) are aligned each time zero is reached, the added disc 55 and the loose-motion or back-lash driving connection 56, 57 prevents the rod 51 from moving inward by reason of the out-of-line position of the notch 55a of disc 55 when the counter is moving in the adding direction.

With the other suggested setting, of groups of two-hundred and eighteen (218) elements and fifty-three (53) unit blank spaces, the auxiliary counters will cross zero and make contact twice while moving in the subtracting direction, but this will have no operational effect because the tape-feeding mechanisms which they control will have been stopped at the first contact and no effect is produced at the subsequent contacts.

One skilled in the art will be able to understand the construction of machines which operate according to the invention from the above description and from the references which have been made to my patent. However, in order to fully disclose one exemplary form of apparatus in the present application, Figs. 5 to 9 have been included and the exemplary embodiment there illustrated will now be described.

The mechanism at the forming station F is shown in Figs. 7 and 8. It comprises a feeding device and forming punches. The wire W, which is suitably contoured in cross-section, and partly preformed if desired, is fed forward at intervals by hard-edged wire-gripping jaws 65 until the forward end overlies a holder die 13 on the turntable 12. A friction device 66 prevents unauthorized movement of the wire.

A simple and effective form of feeding device is illustrated. It comprises jaw-mounting toggle arms 67 and 68 which are hinged together by a pin 69 to permit opening and closing of the jaws 65. The upper arm is pivoted on a fixed pin 70 and is frictionally restrained against free movement thereon by a spring 71 and a friction washer 72. The lower arm, which is carried by the upper arm, has free movement on the pin 69 but when the jaws open enough to clear the wire stock, the lower arm strikes a stop in its hinge which prevents further opening.

The lower end of the lower arm 68 is attached to an actuating slide 73 by a pivot pin 74, and this slide is moved back and forth by a rotary cam 75 and a spring 76. The cam is carried on a rotary shaft 77 which is mounted in the frame 10. An adjustable stop screw 78 limits the outward movement of the slide. Since the upper arm resists movement in both directions, the inward movement of the slide first causes the lower arm to swing forward on the pin 69 to close the jaws on the wire stock and thereafter to feed the stock; and the outward movement of the slide first causes the lower arm to swing backward on the pin 69 to open the jaws and then swing the jaw assembly backward about the pin 70 to prepare for another feeding action. An adjustable stop 80 may halt the forward movement of the upper arm to prevent over-feeding of stock.

The jaws grip the stock at a point where the stock is to be severed and, if desired, they may be made to nick the stock and thus assist severance as well as to provide smooth edges.

The elements are formed by suitable dies of which the punches appear in Fig. 7. From left to right there are shown a piercing punch 82, a parting punch 83, and a head-forming or swaging punch 84. The first two, 82 and 83, may be secured on one reciprocating head 85, carried by a pair of vertical operating rods 86; and the third one, 84, may be secured to another reciprocating head 87 carried by a pair of vertical operating rods 88 (see Fig. 5). The parting punch shears off the forward element (without any scrap loss) and pushes it down into the die and also holds it down while the swaging die is operating to form the head in the die. The piercing punch 82 will have already formed a longitudinally elongated opening in the wire, and when the parting punch severs the forward element at the rear end of this opening, it will form the two jaws of the element. These jaws are left protruding from the periphery of the turntable for further operations. A cover plate 90 holds the elements upon the turntable, the plate being formed to permit the use of special element-holding devices at the stations. The shaft 11 of the turntable 12 is shown in Fig. 7. The coordinated driving means for this and all other parts will be described hereinafter.

For the most part, these forming and feeding operations are similar to the operations described in my patent.

The jaw-spreading mechanisms at the two stations S1 and S2 are substantially identical. It comprises (Fig. 1) a punch 95 which is moved back and forth by a cam 96 and a spring 97. The cam is carried by an actuating shaft 98 which extends down into the frame 10. The shaft 99 for the second jaw-spreading mechanism is also shown in Fig. 1.

The element applying mechanisms at the two stations A1 and A2 are identical except, as explained above, that the controls for the element-attaching mechanism proper at the station A2 are omitted and this mechanism allowed to run continuously. The element applying mechanism for station A1 is shown in Fig. 9.

The tape T1 enters at the bottom over a friction drag pulley 101 and is drawn upward in steps by the pulley 102 on the feed shaft 27 which is actuated by the ratchet wheel 28, pawl 29, cam arm 30, and cam 31 on drive shaft 19. The tape passes through a guide 103 which normally holds it away from the turntable but moves it toward the turntable to place its thick beaded edge between the jaws of an element when the element is to be attached to the tape.

The guide 103 is mounted to slide horizontally and is moved back and forth by a cam 104 and a spring 105. The cam is carried by a sleeve 106 on shaft 19, the sleeve being caused to rotate with the shaft when the clutch 21 is engaged, as previously explained.

The jaws of the elements are closed on the tape by a pair of clamping jaws 110 which are pivoted on upstanding pins 111 secured to the reciprocating guide 103. The clamping jaws are operated by a double-lobed cam 18 carried by the sleeve 106. A spring 112 urges the clamping jaws apart. The clamping jaws are moved into clamping position and closed at the same time that the edge of the tape is moved between the element jaws.

While the elements are being attached to the tape, they are held fast in their holder dies on the turntable by a clamp 113 which is actuated by a vertically reciprocable rod 114, the rod being moved downward by a lever 115 operated by a cam 116 on the shaft 19. It will be noted that the clamp 113 operates every time an element stops at the station, whether it is to be applied to the tape or not. This prevents accidental displacement of elements at all times.

The coordinating drive mechanism is shown principally in Figs. 5 and 6. The main drive shaft 120 is provided with a pulley 121 for actuation by a belt from motor M. Shaft 120 carries an outer pair of matched eccentrics 122 which, through connecting rods 123, operate the vertically reciprocating rods 86 of the punch head 85, and it also carries an inner pair of matched eccentrics 124 which, through connecting rods 125 operate the vertically reciprocating rods 88 of the swaging head 87.

The main shaft also carries a worm cam 126 which imparts turning movement to the turntable shaft 11 through a pin-disc 127, there being as many depending pins on the disc as there are element-holding dies 13 on the turntable. The cam and pins hold or index the dies securely and accurately in a fixed position between moves. In Fig. 5 it appears that the rods 88 interfere with the pin-disc 127 but they do not, because the connecting rods 123 are offset around the disc to prevent interference.

The other mechanisms may be actuated from a large gear wheel 130 which is driven from the main shaft 120 through a jack-shaft 131. Gears 132, 133 on the shafts 120 and 131 respectively, and bevel gears 134 and 135 on the shaft 131 and the gear wheel 130 respectively, establish the driving connection.

The large gear wheel 130 drives the shaft 77 of the stock-feeding mechanism through a loose pinion 140 and a pinion 141 fast on the shaft. The shaft 77 carries a spiral pinion 142 which drives the countershaft 41 through a spiral gear 143. The large gear wheel 130 drives the spreader shafts 98 and 99 and the attaching shafts 19 and 16 by pinions 145, 146, 147 and 148 respectively.

The clamping-jaw cam 18 needs to be a double-lobed cam, hence it will operate the clamping-jaws twice during each rotation of its shaft 19. Then the cam 104 which pushes the clamping-jaws and tape guides toward the turntable, the cam 31 which operates the tape feed, and the cam 116 which operates the hold-down device, will have double lobes because they are also carried on the shaft 19. Shaft 16 at the second attaching station, shafts 98 and 99 at the jaw-spreading stations, and shaft 77 at the element-forming station, will carry double-lobed cams because they turn at the same speed as the shaft 19. The main shaft 120 makes one rotation each time an element is formed; that is, it rotates twice as fast as shafts 77, 98, 99, 19 and 16. The counters, of course, will be suitably geared to register one unit each time an element is formed.

It will thus be apparent that the invention provides extremely simple and inexpensive but reliable mechanism for controlling machine operations and in particular that it provides an improved method for forming slide fastener or similar units.

While one embodiment of the invention has been described in detail to illustrate the principles thereof, it is to be understood that the invention may be variously embodied within the limits of the prior art and the scope of the subjoined claims.

I claim as my invention:

1. The method of applying interfitting fastener elements to a pair of tapes which are to be assembled together which comprises, feeding elements in regular sequence toward said tapes, applying a plurality of successive elements in a group to a first tape while moving the tape in steps, discontinuing the application of elements to the first tape and applying a plurality of successive elements in a group to a second tape in a group containing the same number of elements applied to the first tape while continuing to move the first tape in steps for a given length of time in synchronism with the second tape to form an inter-group spacing, then repeating the operation in continuous sequence, and thereafter assembling the tapes with groups of contemporaneously applied elements associated with each other.

2. The method of making slide fasteners and applying them to a pair of tapes which are to be assembled together which comprises, forming identical elements by one and the same forming means, transferring said elements successively as formed by the forming means toward the tapes, applying a plurality of successive elements in a group to a first tape while moving the tape in steps, discontinuing the application of elements to the first tape and applying a plurality of elements to a second tape in a group containing the same number of elements applied to the first tape while continuing to move the first tape in steps for a given length of time in synchronism with the second tape to form an inter-group spacing, then repeating the operation in alternation in continuous sequence, and thereafter assembling the tapes with groups of contemporaneously applied elements associated with each other.

3. The method of applying interfitting fastener elements to a pair of tapes which are to be assembled together which comprises, applying a plurality of elements in a group exclusively to a first tape while moving it in steps, alternately applying a plurality of elements in a group exclusively to the second tape while moving it in steps, and moving the tape which is not receiving elements at times in steps in synchronism with the tape which is receiving elements to provide inter-group spacings between groups of elements on the tapes, and thereafter assembling the tapes with groups of contemporaneously applied elements associated with each other.

4. The method as set forth in claim 3, further characterized by the fact that each tape moves in steps without halting until a group of elements and a predetermined spacing not greater than the group length are provided therefor.

5. Apparatus for applying elements in spaced groups upon a plurality of strips, comprising in combination, a carrier movable in steps at unit intervals consistently in one direction to carry elements at unit intervals toward successive attaching stations along the carrier, mechanism at each of the attaching stations for applying elements from the carrier to a strip, and means controlling the attaching station mechanism to cause elements to be attached to strips in groups at unit intervals but in different group periods at the respective stations.

6. Apparatus for making and attaching identical interfitting slide fastener elements to paired tapes which are assembled and used together, comprising in combination, unitary means for making identical elements, means for attaching a plurality of said elements successively in the order as made by said element making means in alternate groups to two tapes, means for transferring said elements successively as formed from said element making means in alternate groups to each of said attaching means, and means coordinating the operation of said element making means, said element attaching means, and said element transferring means, to operate in steps together.

7. Apparatus for applying elements in spaced groups upon a plurality of strips, comprising in combination, a carrier movable in steps at unit intervals consistently in one direction to carry elements at unit intervals toward successive attaching stations along the carrier, mechanism at each of the attaching stations for applying elements from the carrier to a strip, said means including parts which advance the strip at unit intervals, and means controlling the attaching-station mechanism to cause elements to be attached to an advancing strip in groups at unit intervals but in different group periods at the respective stations, said means causing advancement of the strip at each station at unit intervals at times when elements are not being applied to the strip at that station but are being applied at a different station.

8. Apparatus for applying elements in spaced groups upon a plurality of strips, comprising in combination, a carrier movable in steps at unit intervals consistently in one direction to carry elements at unit intervals toward successive attaching stations along the carrier, mechanism at each of the attaching stations for applying elements from the carrier to a strip, and means controlling the attaching-station mechanism to cause elements to be attached to strips in groups at unit intervals but in different group periods at the respective stations, said means including paired oppositely driven periodically reversing counters which are synchronised with the unit movements of the carrier and the unit operations at the attaching stations.

9. Apparatus for applying elements in spaced groups upon a plurality of strips, comprising in combination, a carrier movable in steps at unit intervals consistenly in one direction to carry elements at unit intervals toward successive attaching stations along the carrier, mechanism at each of the attaching stations for applying elements from the carrier to a strip, said means including parts which advance the strip at unit intervals, and means controlling the attaching-station mechanism to cause elements to be attached to an advancing strip in groups at unit intervals but in different group periods at the respective stations, said means causing advancement of the strip at each station at unit intervals at times when elements are not being applied to the strip at that station but are being applied at a different station, said means including a plurality of pairs of oppositely driven periodically reversing counters which are synchronized with the unit movements of the carrier and the unit operations at the attaching stations.

10. Apparatus for controlling timed operations, comprising in combination, a pair of ascending-descending counters geared together for opposite drive from a single driving member, one of said counters being set at a predetermined limiting position when the other is set at an opposite limiting position, means for reversing the drive direction of said member, and means actuated by said counters at limiting positions for imparting a controlling impulse including the impulse required for controlling the action of said drive-reversing means.

11. Apparatus for controlling timed operations, comprising in combination, a plurality of pairs of ascending-descending counters all geared together for opposite drive of the counters of each pair from a single driving member, one of the counters of a pair being set at a predetermined limiting position when the other is set at an opposite limiting position, the set limiting positions of all counters having a predetermined relationship to the limiting position of one of the counters, means for reversing the drive direction of said member, and means actuated by all of said counters at limiting positions for imparting controlling impulses, the impulses of one pair of counters controlling the action of said drive-reversing means.

12. Apparatus for controlling a plurality of timed operations of a plurality of subjective mechanisms, comprising in combination, a master pair and an auxiliary pair of ascending-descending counters geared together for opposite drive of the counters of each pair from a single driving member, trip mechanism for each counter operating to furnish a controlling impulse at zero when descending, one of said master counters being set at a selected number above zero when the other stands at zero and each of said auxiliary counters being set at a selected number above zero when a respective reversely-geared master counter stands at zero, means for reversing the drive direction of said counter-driving member, means controlled in alternation by the master counters for initiating all operations for the respective subjective mechanisms and also controlling the operation of said counter drive-reversing means, and means controlled by the auxiliary counters for stopping one operation of a respective subjective mechanism.

13. Apparatus for applying elements in spaced groups to two strips at two stations, comprising in combination, mechanism for advancing elements toward the stations, element-attaching mechanism and tape-feeding mechanism at each of said stations, a master pair and an auxiliary pair of ascending-descending counters geared together for opposite drive of the counters of each pair from a single driving member, trip mechanism for each counter operating to furnish a controlling impulse at zero when descending, one of said master counters being set at a selected number above zero when the other stands at zero and each of said auxiliary counters being set at a selected number above zero when a respective reversely-geared master counter stands at zero, means for reversing the drive direction of said counter-driving member, means controlled by said master counters for initiating the tape-feeding and element-applying operations at both stations, for ending the element-attaching operations at both stations, and also controlling the operation of said counter drive-reversing means, and means controlled by said auxiliary counters for ending the tape-feeding operations at both stations.

14. Slide fastener apparatus, comprising in combination, an element carrier movable in steps consistently in one direction, means for forming and feeding elements head first with jaws protruding at unit intervals to holders on said carrier, means around said carrier for spreading the protruding jaws at unit intervals, and means at a plurality of stations for attaching the elements at unit intervals in groups to each of a plurality of tapes.

15. Slide fastener apparatus, comprising in combination, a turntable provided with a plurality of element holders spaced about its periphery, means for forming elements and leaving them disposed head first in said holders with their jaws protruding, means for partially spreading the element jaws at a first spreading station, means for further spreading the jaws at a second spreading station, means at a first attaching station for attaching all the elements reaching the station in a given period as a group on a tape and concurrently feeding the tape, means at a second attaching station for attaching all the elements passing the first station as a group on a tape and concurrently feeding the tape, and means for coordinating the action at the two attaching stations.

16. Slide fastener apparatus, comprising in combination, a turntable provided with a plurality of element holders spaced about its periphery, means for forming elements and leaving them disposed head first in said holders with their jaws protruding, means for partially spreading the element jaws at a first spreading station, means for further spreading the jaws at a second spreading station, means at a first attaching station for attaching all the elements reaching the station in a given period as a group on a tape and concurrently feeding the tape, means at a second attaching station for attaching all the elements passing the first station as a group on a tape and concurrently feeding the tape, and means for coordinating the action at the two attaching stations, said coordinating means comprising paired opposed counters and subservient servo controlling devices for the attaching station mechanism, and servo controlled reversing drive mechanism for the counters which is supervised by the counters.

17. Apparatus for controlling timed operations, comprising in combination, a master pair and an auxiliary pair of ascending-descending counters geared for opposite drive in pairs from a single driving member, means for reversing the drive of said member alternately as the alternate master counters reach zero while descending, means actuated by said auxiliary counters for giving a controlling impulse at zero while descending and while the master counters are between limits, whereby the auxiliary counters move below zero and thus pass the impulse-giving position more than once during a cycle, and means for rendering said auxiliary counters ineffective for giving an impulse in the ascending direction of movement.

18. Apparatus of the character set forth comprising in combination, a pair of opposed main counters of large capacity and a pair of opposed auxiliary counters of small capacity all geared together, the main counters operating in continuous reversal between settable limits and the auxiliary counters making more than one passage past an impulse imparting position, and means for preventing the auxiliary counters from giving an impulse when passing said position except when moving in one direction, said last-mentioned means comprising an auxiliary impulse controlling member having a loose motion connection with a principal impulse controlling member whereby it is in registry in only one direction of movement.

19. Apparatus for attaching fastener elements in successive groups to a pair of tapes with spaces between the groups, comprising in combination, an element carrier, controllable element-attaching means at a first station, continuously operating element-attaching means at a second station, means for periodically energizing the element-attaching means at the first station to attach all the elements reaching it on the carrier, means for feeding the tape at the first station in steps while elements are being attached and for a certain period thereafter to provide a blank space, means for feeding the tape at the second station in steps while elements are being attached and for a certain period thereafter to provide a blank space, paired oppositely driven counters, and servo devices controlled by said counters for controlling the action of said fastener-attaching and tape-feeding means.

20. Apparatus for attaching fastener elements in successive groups to a pair of tapes with spaces between the groups, comprising in combination, an element carrier, controllable element-attaching means at a first station, continuously operating element-attaching means at a second station, means for periodically energizing the element-attaching means at the first station to attach all the elements reaching it on the carrier, means for feeding the tape at the first station in steps while elements are being attached and for a certain period thereafter to provide a blank space, means for feeding the tape at the second station in steps while elements are being attached and for a certain period thereafter to provide a blank space, paired oppositely driven counters, and servo devices controlled by said counters for controlling the action of said fastener-attaching and tape-feeding means, said counters including a main pair of counters operating in continuous reversal between a zero position and a settable upper position and providing a controlling impulse at the zero position, and an auxiliary pair of counters operating in continuous reversal between a settable positive position and a sub-zero position and providing a controlling impulse at the zero position while moving in a subtracting direction, the settable upper position on the main counters determining the number of elements attached in each group and the settable positive position on the auxiliary counters determining the number of units in the spaces between groups.

21. Apparatus for attaching fastener elements to tapes at a pair of element-attaching stations, comprising in combination, means for continuously feeding elements toward the attaching stations in successive order, tape-feeding means and servo controls therefor at each station, element-attaching means at each station and servo controls for the element-attaching means at the first station, the element-attaching mechanism at the second station operating continuously, and opposed oppositely driven counters timed with the element-feeding, tape-feeding, and element-attaching mechanisms for controlling the operation of said mechanisms.

22. Apparatus for attaching fastener elements to tapes at a pair of element-attaching stations, comprising in combination, means for continuously feeding elements toward the attaching stations in successive order, tape-feeding means and servo controls therefor to start and stop the feed at each station, element-attaching means at each station and servo controls for the element-attaching means at the first station, the element-attaching mechanism at the second station operating continuously, and opposed oppositely driven counters timed with the element-feeding, tape-feeding, and element-attaching mechanisms for controlling the operation of said mechanisms, said tape-feeding mechanisms being controlled for stopping by one pair of counters and all other operations at the stations being controlled by another pair of counters.

23. Apparatus for attaching fastener elements to tapes at two attaching stations, comprising in combination, means for feeding elements at spaced intervals in successive order toward the attaching stations, tape-feed mechanism and controlling means therefor including electro-magnetic trip devices at each station for selectively rendering said tape-feed mechanism effective for moving a tape or to stop it, element-attaching mechanism at each station and controlling means for said mechanism including electro-magnetic trip devices at the first station for selectively rendering said element-attaching mechanism effective or ineffective, the element-attaching mechanism at the second station being operative at all times and being effective for attaching elements whenever they arrive at the second station, opposed oppositely driven counters which periodically reverse direction under their own control in servo fashion, and means connecting said counters with said electro-magnetic trip devices, said counters and controlling means being so organized as to cause all elements arriving at the first station to be removed and attached to a tape in a group while feeding the tape and thereafter to feed the tape further in steps to form an inter-group spacing and then to stop, to start feeding the tape at the second station when elements begin arriving thereat after passing the first station, the element-attaching mechanism at the second station applying elements to the tape while elements continue to arrive until a group is applied, and thereafter to continue feeding the tape at the second station until an inter-group spacing is formed while elements are again being attached at the first station, and to repeat these operations in endless succession.

OSBORNE FIRING.